United States Patent Office 3,000,868
Patented Sept. 19, 1961

---

3,000,868
VINYL TOLUENE-ALPHA METHYL STYRENE POLYMERS
Paul O. Powers, Pittsburgh, Pa., assignor to Pennsylvania Industrial Chemical Corporation, Clairton, Pa., a corporation of Pennsylvania
No Drawing. Filed Dec. 30, 1959, Ser. No. 862,774
4 Claims. (Cl. 260—88.2)

This invention relates to resinous copolymers of vinyl toluene and alpha methyl styrene, and to their production.

A primary object of the invention is to provide hard copolymers of vinyl toluene and alpha methyl styrene that are of light color, of excellent solubility in a variety of solvents, even at low temperatures, that are easily prepared, and the softening point of which can be varied, as desired, from about 100° C. to 120° C., and even 130° C.

A further object is to provide a method of making copolymers in accordance with the foregoing object that is simple, easily practiced, results in good yields, and may be performed either in batch or by continuous operation.

The copolymers of this invention are formed by contacting the vinyl toluene and alpha methyl styrene monomers with boron trifluoride. For most purposes it is preferred that the reactants be used in the proportion of, by weight, three parts of vinyl toluene per part of alpha methyl styrene. These proportions are productive of copolymers of optimum freedom from color, excellent solubility, and in excellent yield. At the expense of yield and solubility characteristics there may be some departure from the proportion just stated although for most purposes there should not be more than about 33 percent by weight 30 to 35 percent) of alpha methyl styrene with the remainder vinyl toluene. The individual vinyl toluene isomers may be used as well as mixtures of two or more of them.

The character of the copolymer resin may be controlled in various ways. The vigor of the reaction may be, and preferably is, modified by dissolving the monomers in an inert solvent, a variety of which may be used for this purpose. Examples are toluene, xylene, petroleum base solvent naphtha, such as Solvesso 100 (an aromatic solvent of petroleum origin), and blends of such solvents with mineral spirits.

The character of the resin may be varied also by control of the reaction temperature by cooling the reaction body. In general, at any given temperature, the higher the concentration of reactants in the solvent the lower will be the softening point, and for any given concentration the higher the reaction temperature the lower the softening point will be. In this way resins can be produced having softening points (Ball and Ring) from about 100° C. to 130° C.

In the preferred practice of the invention boron trifluoride gas is bubbled into the solution of the monomers. Although for many purposes from 0.05 to 0.1 percent by weight based on the weight of the monomers suffices, larger amounts may be used if desired, say up to 0.3 percent. For reasons of economy and to simplify working up of the resin, still larger amounts are undesirable. Instead of gaseous boron fluoride there may be used such of its addition compounds, or complexes, as those which, as is well known, it forms with a wide variety of organic compounds such as, for example, the simple dialkyl ethers, esters, lower alkyl alcohols, acids, and the like.

The solvents used should be free from resin-forming constituents, which tend to cause these copolymers to discolor although once the solvent is used such resin-formers are destroyed so that the solvent may then be recovered and recycled. Similarly, preformed polymers in the reactants are to be avoided, especially where they are insoluble in aliphatic solvents.

The resins thus produced may be recovered in various ways that are conventional in the synthetic resin field. Thus, the boron trifluoride is neutralized, suitably with hydrated lime and clay, such as Attapulgus clay, or fuller's earth. About 0.1 percent of each based on the monomers is generally sufficient where 0.05 percent of boron fluoride has been used. Proportionately larger amounts will be needed with greater amounts of boron fluoride. In this practice the lime is added first followed by the clay, and the solution is suitably held at 60° to 65° C. for one-half hour followed by filtration. The reaction body is then heated to distill off the solvent, as by heating to about 240° C., when live steam is introduced and steam distillation is continued until the ratio of water to oil in the distillate is about 25:1.

In this way there are produced water white copolymers of color less than 1 on the Gardner scale, that are soluble, even down to 0° C., in low odor mineral spirits, such as Chemsol 143, or low kauri-butanol solvents, such as Stoddard solvent. These resins are, as indicated above, of about 100° C. to 120° or 130° C. softening point. This combination of properties adapts them to a variety of uses including, by way of example, hard drying varnishes, pressure sensitive tapes, chewing gum, adhesives and xerography papers.

As an example of the invention reference may be made to a full scale plant run in which three parts of vinyl toluene and one part of a mixture of the para and meta isomers of alpha methyl styrene were dissolved in sufficient Solvesso 100 (an aromatic solvent of petroleum origin) to provide a 50 percent solution, all parts being by weight. This mixture was polymerized at about 35° C. using 0.10 percent by weight of boron trifluoride. The resin was recovered as described above. The resin was of 120° C. softening point, water white on the Gardner scale, of 1.051 specific gravity (25° C.), of 1.585 refractive index (Bicke 20° C.), and it had an acid number of 0.6 and a Wjis iodine number of 7.5; indicating the resin to have good oxidation resistance.

In contrast, using the same proportions, solution concentration and amount of boron trifluoride but reacted at 60° C. to 65° C. the product was of but 101° to 104° C. softening point.

Polymerization of alpha methyl styrene monomer under similar conditions yields low molecular weight polymer that is primarily oil, and if the reaction temperature is lowered sufficiently to bring the softening point to at least 100° C., the polymer is not soluble in aliphatic solvents. Similarly, a homopolymer of vinyl toluene is insoluble in mineral spirits. And if styrene be substituted for vinyl toluene its copolymer with alpha methyl styrene is insoluble.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. That method comprising subjecting a mixture consisting essentially of, by weight, from 25 to 35 percent of alpha methyl styrene and 75 to 65 percent of vinyl toluene in an inert solvent to boron trifluoride and thereby producing a copolymer of alpha methyl styrene and vinyl toluene, and recovering the copolymers.

2. A method according to claim 1, said solvent being free from resin-forming compounds, and said alpha methyl styrene and vinyl toluene being free from preformed polymers.

3. That method comprising subjecting a mixture consisting essentially of, by weight, from 25 to 35 percent of alpha methyl styrene and 75 to 65 percent of vinyl toluene in an inert solvent to gaseous boron trifluoride and thereby producing a copolymer of alpha methyl styrene and vinyl toluene, neutralizing residual boron trifluoride, heating and steam distilling the neutralized reaction body and recovering the copolymer.

4. Resin consisting essentially of a copolymer of, by weight, 25 to 35 percent of alpha methyl styrene and 75 to 65 percent of vinyl toluene, said resin being of low color, of 100° to 130° C. softening point (Ball and Ring), and of good solubility in low odor mineral spirits and low kauri-butanol solvents down to 0° C.

References Cited in the file of this patent

UNITED STATES PATENTS

| | | |
|---|---|---|
| 2,474,671 | Hersberger | June 28, 1949 |
| 2,773,052 | Cohen et al. | Dec. 4, 1956 |

OTHER REFERENCES

Boundy-Boyer: "Styrene—Its Polymers, Copolymers, and Derivatives," Monograph Series No. 115, pages 1241–1244 (1952).

UNITED STATES PATENT OFFICE
CERTIFICATE OF CORRECTION

Patent No. 3,000,868 September 19, 1961

Paul O. Powers

It is hereby certified that error appears in the above numbered patent requiring correction and that the said Letters Patent should read as corrected below.

Column 2, lines 30 and 31, strike out "a mixture of the para and meta isomers of".

Signed and sealed this 3rd day of July 1962.

(SEAL)
Attest:

ERNEST W. SWIDER
Attesting Officer

DAVID L. LADD
Commissioner of Patents